(12) United States Patent
Yoshimura et al.

(10) Patent No.: US 11,691,265 B2
(45) Date of Patent: Jul. 4, 2023

(54) ROBOT

(71) Applicant: SEIKO EPSON CORPORATION, Tokyo (JP)

(72) Inventors: Kazuto Yoshimura, Matsumoto (JP); Junichi Kurokawa, Azumino (JP); Yoshiteru Nishimura, Shiojiri (JP); Etsuo Tsuji, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 301 days.

(21) Appl. No.: 17/084,678

(22) Filed: Oct. 30, 2020

(65) Prior Publication Data

US 2021/0129315 A1 May 6, 2021

(30) Foreign Application Priority Data

Oct. 31, 2019 (JP) .............................. JP2019-199411

(51) Int. Cl.
*B25J 9/00* (2006.01)
*F16M 5/00* (2006.01)
*B25J 19/02* (2006.01)

(52) U.S. Cl.
CPC ............. *B25J 9/0009* (2013.01); *B25J 19/02* (2013.01); *F16M 5/00* (2013.01)

(58) Field of Classification Search
CPC .............. B25J 9/0009; B25J 9/02; F16M 5/00
USPC .......................................................... 248/542
See application file for complete search history.

(56) References Cited

U.S. PATENT DOCUMENTS

| 10,391,643 B2* | 8/2019 | Goto .................... B25J 19/0029 |
| 10,821,613 B2* | 11/2020 | Yoshimura ........... B25J 19/0029 |
| 11,117,252 B2* | 9/2021 | Yoshimura ............. B25J 9/1612 |
| 2012/0048027 A1 | 3/2012 | Hashiguchi |
| 2018/0133902 A1 | 5/2018 | Inoue et al. |

FOREIGN PATENT DOCUMENTS

| JP | 2012139771 A | 7/2012 |
| JP | 2018080941 A | 5/2018 |

* cited by examiner

*Primary Examiner* — Todd M Epps
(74) *Attorney, Agent, or Firm* — Gang Yu

(57) ABSTRACT

A robot includes a base installed on an installation surface, a robot arm coupled to the base, a force detection section coupled to the base and detecting a force applied to the robot arm, a coupling member having a plurality of convex parts provided between the installation surface and the force detection section, projecting toward the force detection section side, and contacting the force detection section, and first fixing members provided in positions where the convex parts are provided and fixing the force detection section and the coupling member.

8 Claims, 8 Drawing Sheets

ROBOT

The present application is based on, and claims priority from JP Application Serial Number 2019-199411, filed Oct. 31, 2019, the disclosure of which is hereby incorporated by reference herein in its entirety.

BACKGROUND

1. Technical Field

The present disclosure relates to a robot.

2. Related Art

Recently, in factories, due to labor cost rise and labor shortage, work manually performed in the past has been increasingly automated by various robots and robot peripherals. The various robots have e.g. bases, arms supported by the bases, and force sensors provided in the bases as shown in JP-A-2018-080941. In the robots, the arms are controlled based on the detection results of the force sensors.

In the robot disclosed in JP-A-2018-080941, the force sensor is fixed to the installation surface via a plate-like fixing member. Further, the force sensor has a fixed portion projecting toward the fixing member side. A through hole for fixing bolt is formed in the fixed portion. The robot is fixed to the fixing member by insertion of a bolt through the through hole for fixing bolt.

However, in JP-A-2018-080941, the fixed portion is provided in the force sensor, and thus, for example, when the fixed portion is fixed to the fixing member distorted by fixation to the installation surface having irregularities, the force sensor tends to be distorted. Due to the distortion of the force sensor, a problem of reduction in detection accuracy of the force sensor arises.

SUMMARY

The present disclosure has been achieved to solve at least a part of the above described problem and can be realized by the following configurations.

A robot according to an application example includes a base installed on an installation surface, a robot arm coupled to the base, a force detection section coupled to the base and detecting a force applied to the robot arm, a coupling member having a plurality of convex parts provided between the installation surface and the force detection section, projecting toward the force detection section side, and contacting the force detection section, and first fixing members provided in positions where the convex parts are provided and fixing the force detection section and the coupling member.

A robot according to an application example includes a base installed on an installation surface, a robot arm coupled to the base, a force detection section coupled to the base and detecting a force applied to the robot arm, a coupling member provided between the installation surface and the force detection section, a plurality of spacers provided between the force detection section and the coupling member and separating the force detection section and the coupling member, and first fixing members provided in positions where the spacers are provided and fixing the force detection section and the coupling member.

DESCRIPTION OF EXEMPLARY EMBODIMENTS

As below, a robot according to the present disclosure will be explained in detail based on preferred embodiments shown in the accompanying drawings.

First Embodiment

Figure 1:
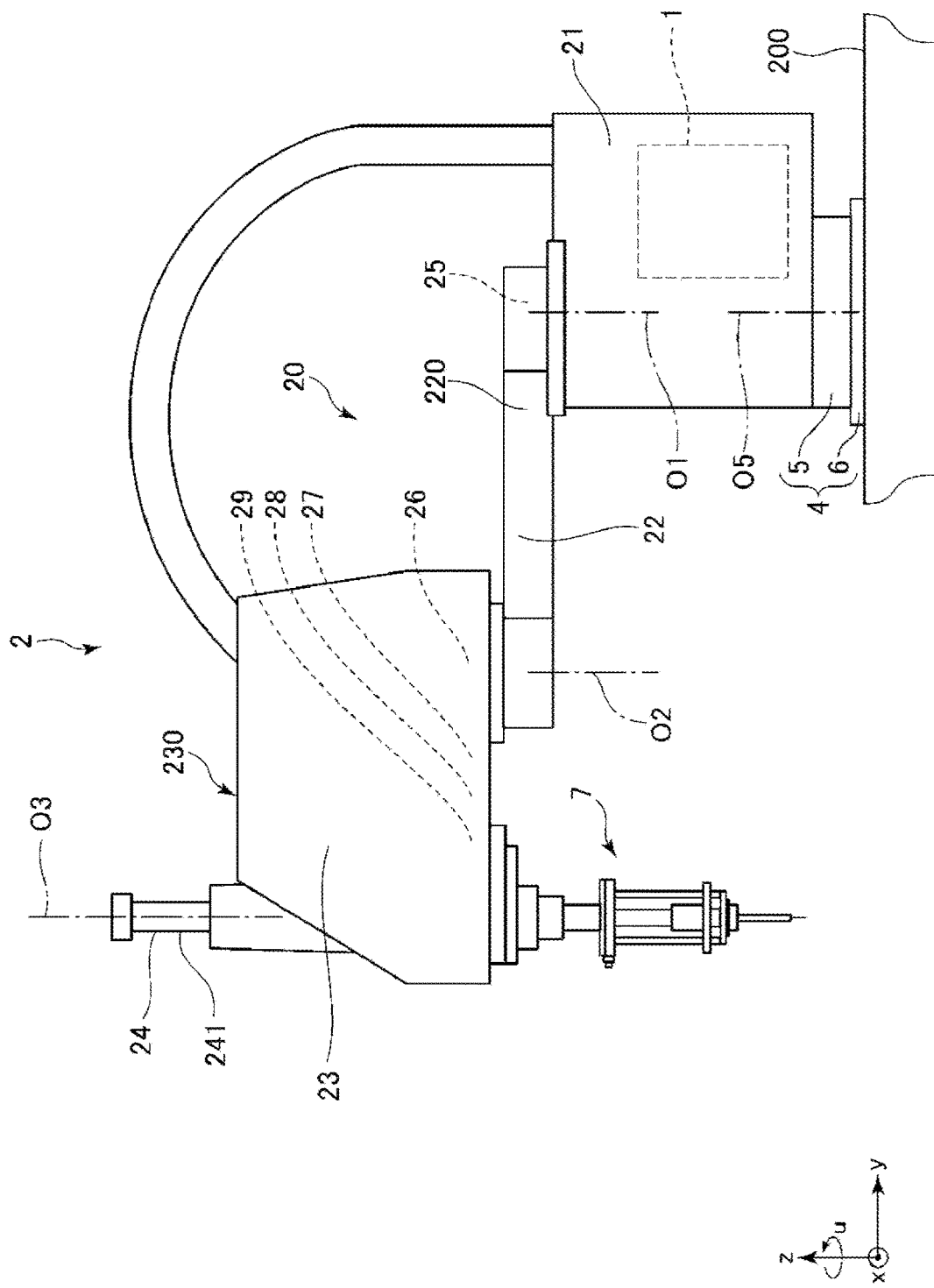
FIG. 1 is a side view showing a robot system including a first embodiment of a robot according to the present disclosure.
Figure 2:
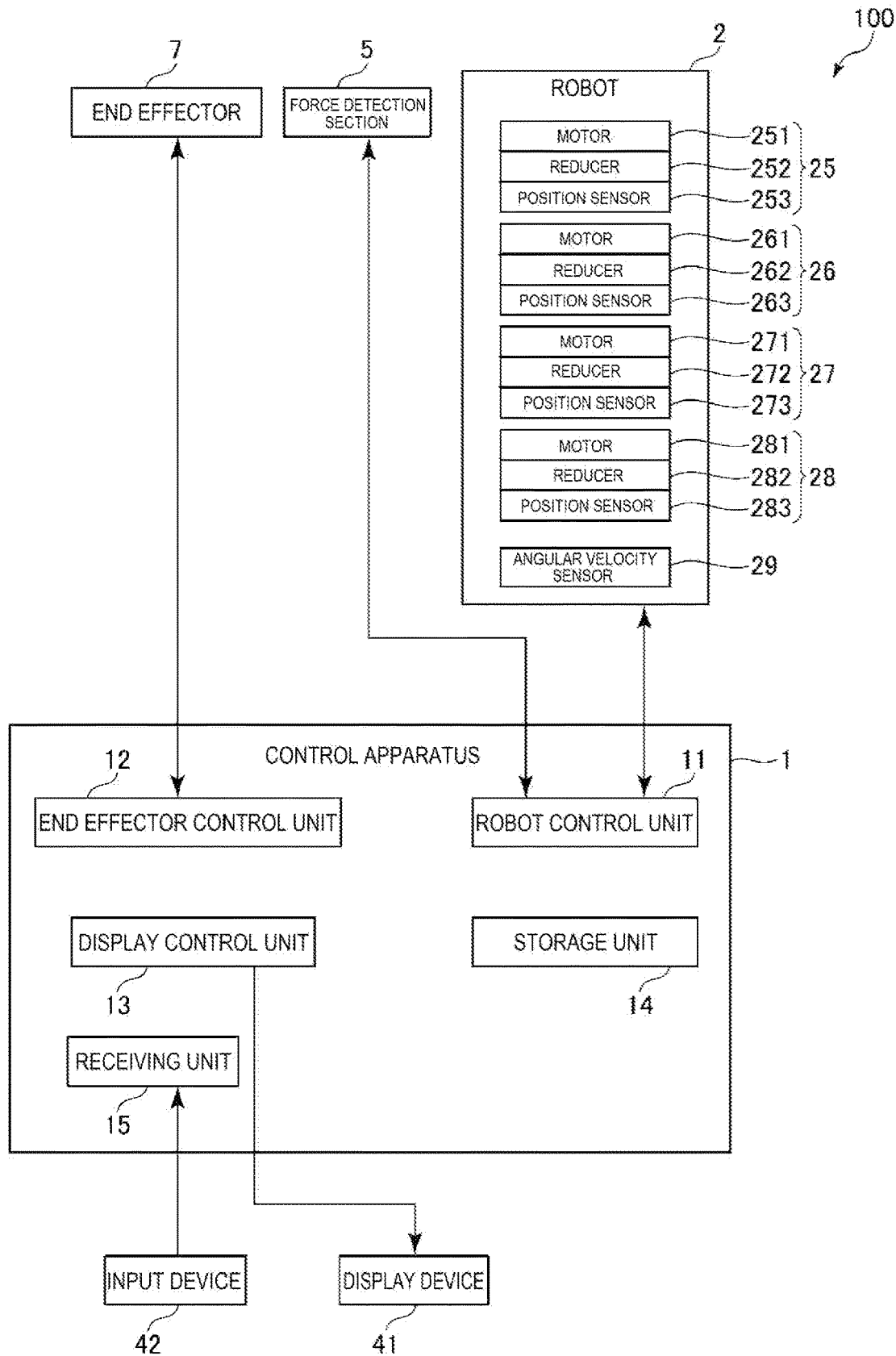
FIG. 2 is a block diagram of the robot system shown in FIG. 1.
Figure 3:
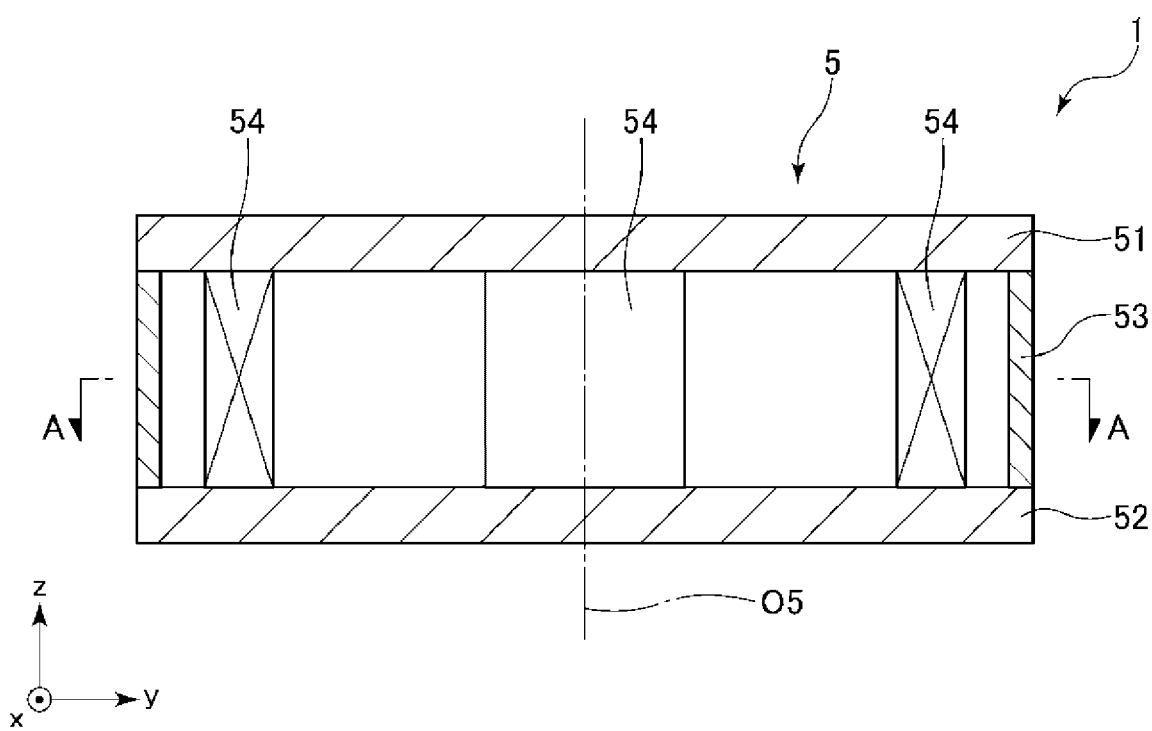
FIG. 3 is a longitudinal sectional view of a force detection section shown in FIG. 1.
Figure 4:
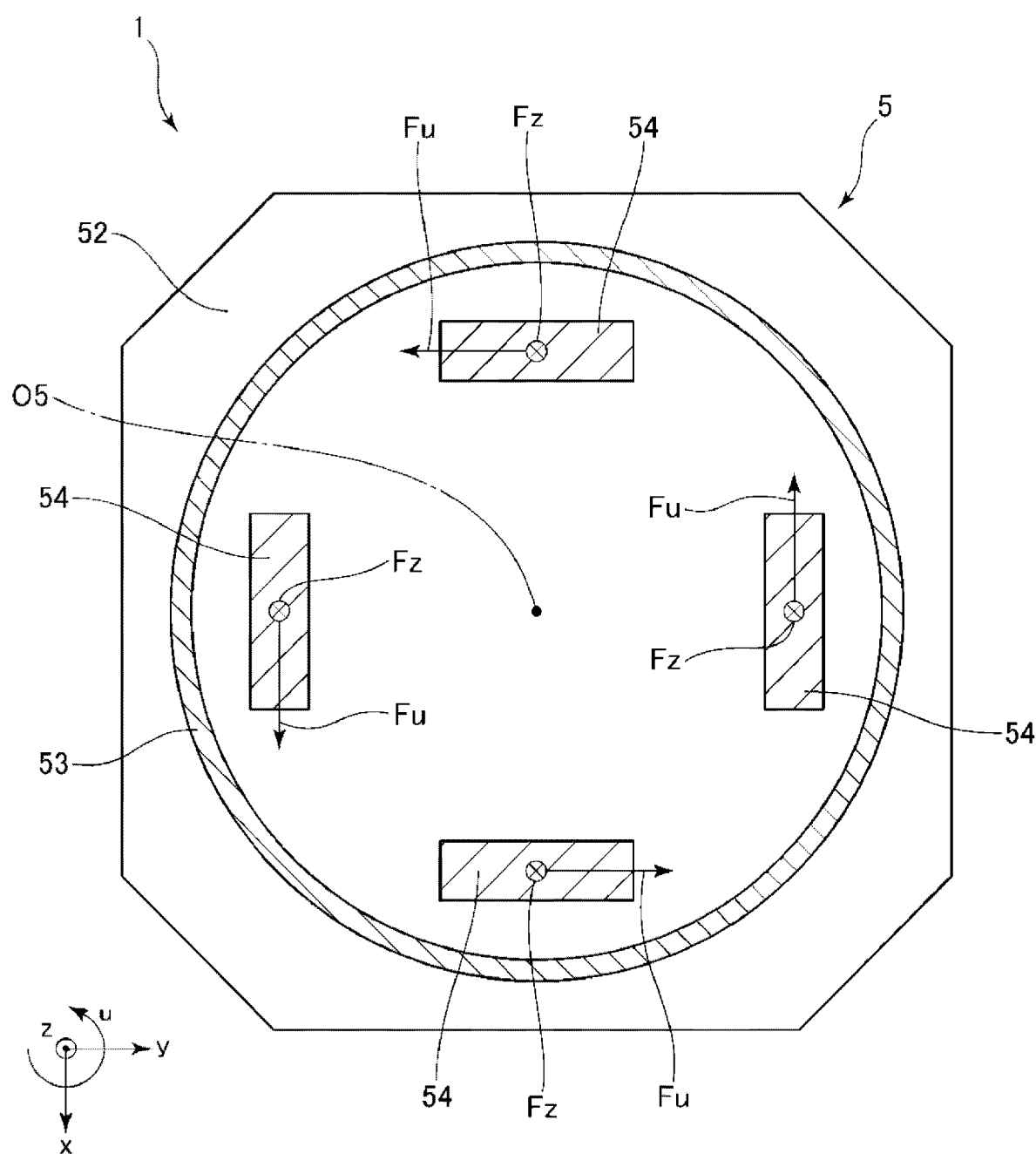
FIG. 4 is a sectional view along line A-A in FIG. 3.
Figure 5:
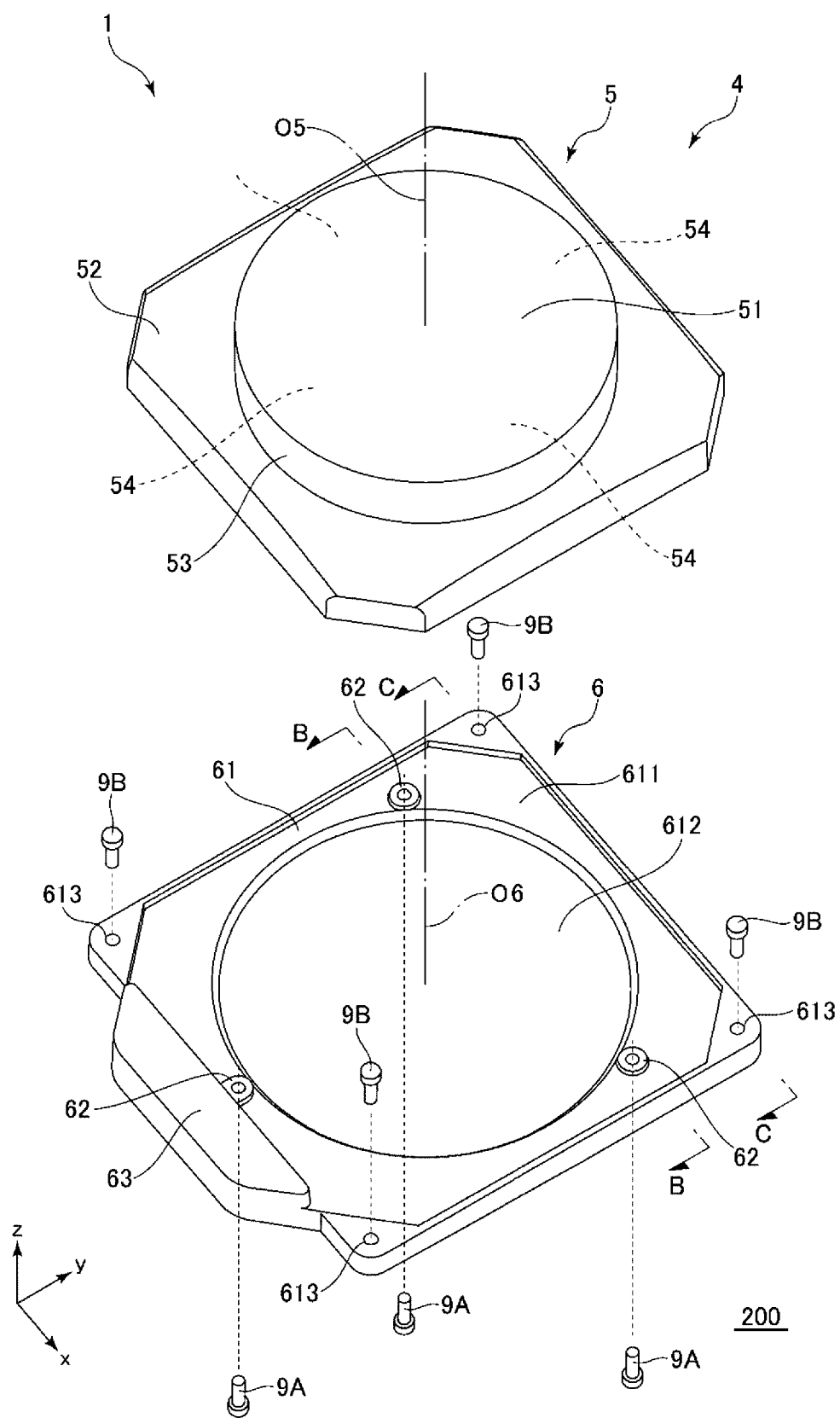
FIG. 5 is an exploded perspective view of a force detection unit shown in FIG. 1.
Figure 6:
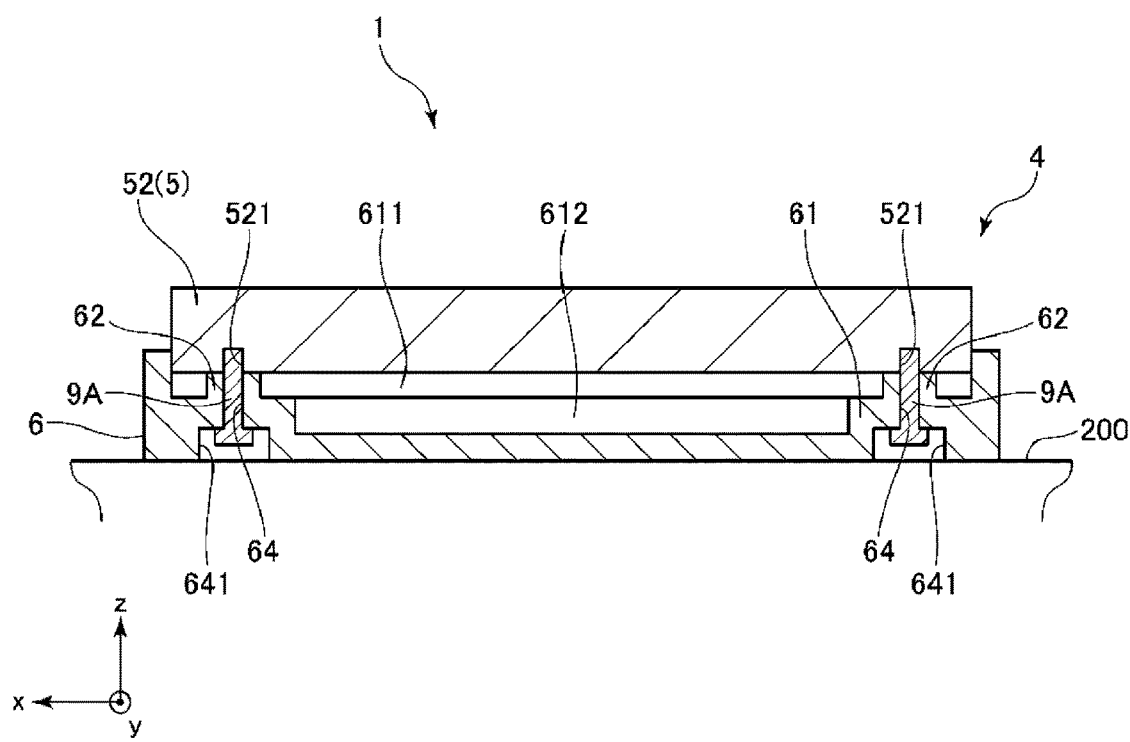
FIG. 6 is a sectional view along line B-B in FIG. 5.
Figure 7:
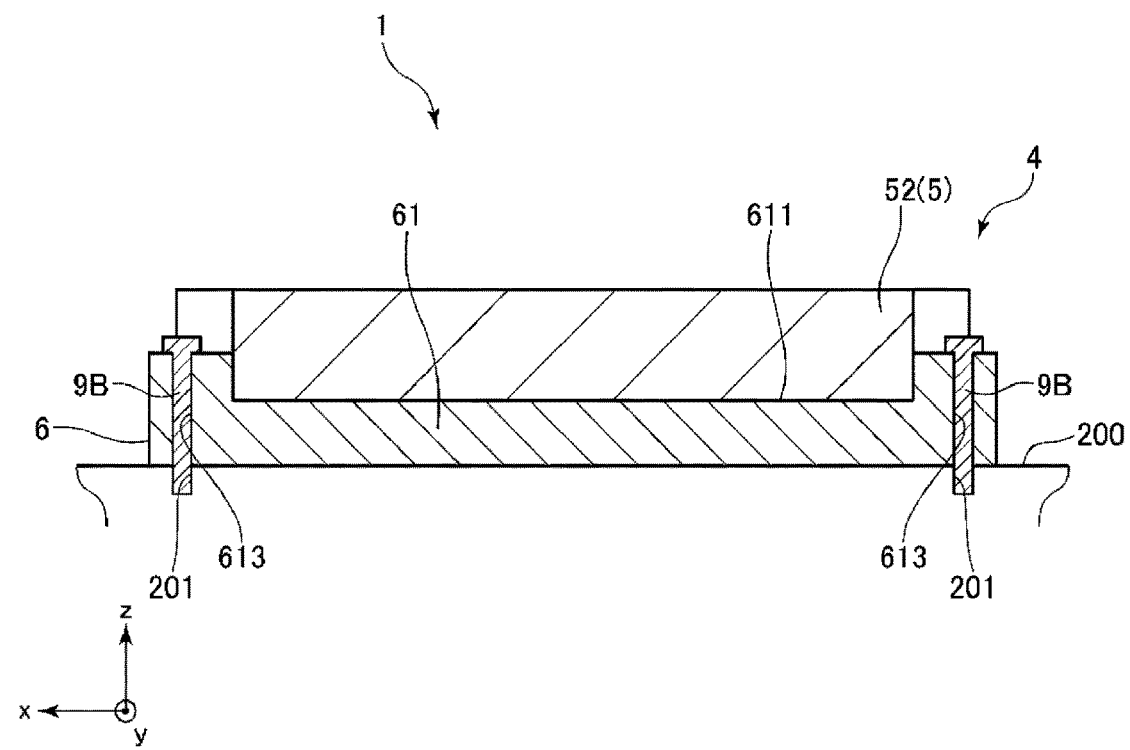
FIG. 7 is a sectional view along line C-C in FIG. 5.
Figure 8:
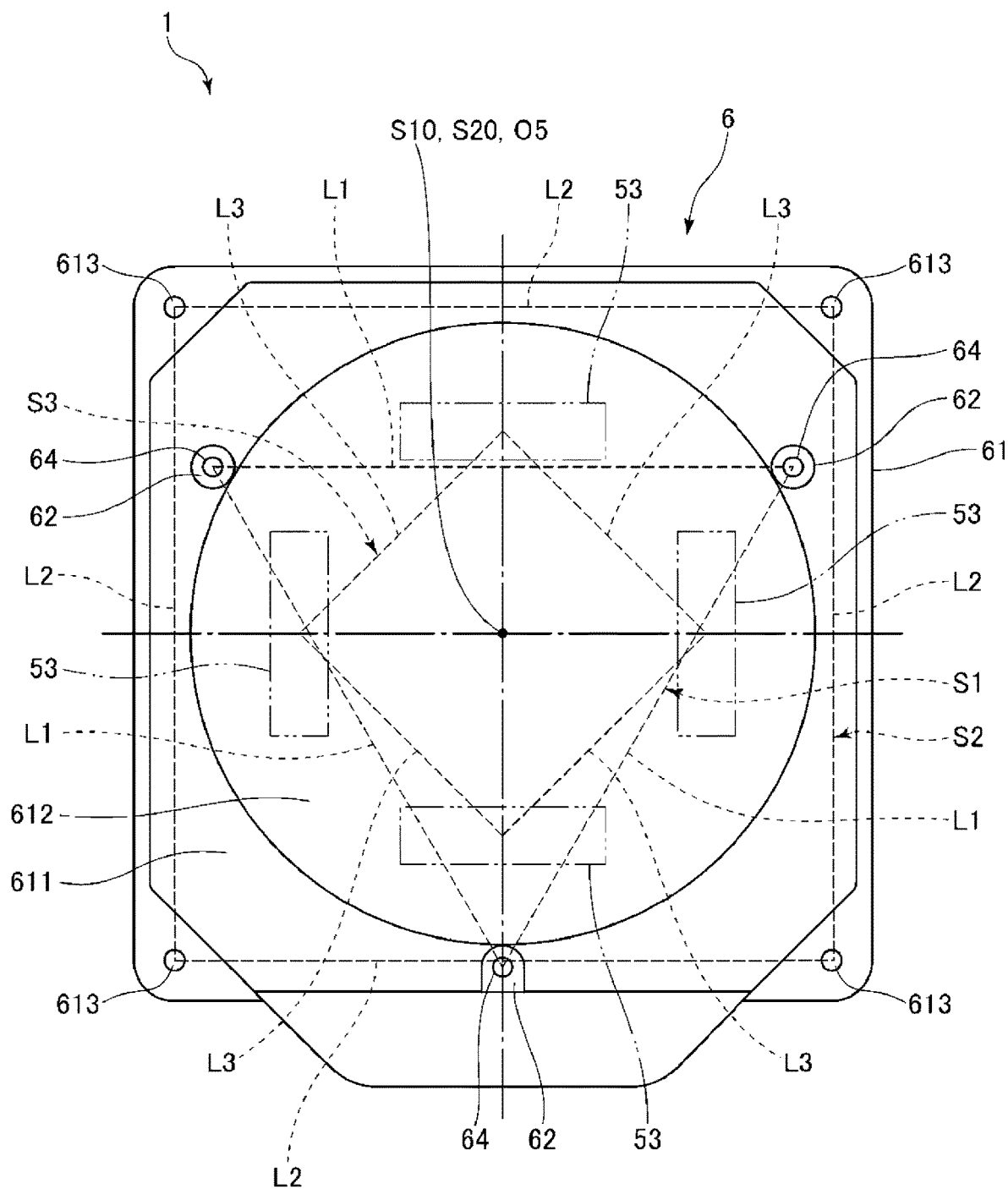
FIG. 8 is a plan view of a coupling member shown in FIG. 5.

FIG. 1 is the side view showing the robot system including the first embodiment of the robot according to the present disclosure. FIG. 2 is the block diagram of the robot system shown in FIG. 1. FIG. 3 is the longitudinal sectional view of the force detection section shown in FIG. 1. FIG. 4 is the sectional view along line A-A in FIG. 3. FIG. 5 is the exploded perspective view of the force detection unit shown in FIG. 1. FIG. 6 is the sectional view along line B-B in FIG. 5. FIG. 7 is the sectional view along line C-C in FIG. 5. FIG. 8 is the plan view of the coupling member shown in FIG. 5.

In FIGS. 1 and 5 to 7, for convenience of explanation, an x-axis, a y-axis, and a z-axis are shown as three axes orthogonal to one another. Hereinafter, directions parallel to the x-axis are also referred to as "x-axis directions", directions parallel to the y-axis are also referred to as "y-axis directions", and directions parallel to the z-axis are also referred to as "z-axis directions". Further, hereinafter, the pointer sides of the respective arrows in the drawings are referred to as "+ (plus)" and the tail sides are referred to as "− (minus)", the direction parallel to the +x-axis direction is also referred to as "+x-axis direction", the direction parallel to the −x-axis direction is also referred to as "−x-axis direction", the direction parallel to the +y-axis direction is also referred to as "+y-axis direction", the direction parallel to the −y-axis direction is also referred to as "−y-axis direction", the direction parallel to the +z-axis direction is also referred to as "+z-axis direction", and the direction parallel to the −z-axis direction is also referred to as "−z-axis direction". Furthermore, directions about the z-axis and directions about an axis parallel to the z-axis are also referred to as "u-axis directions".

Hereinafter, for convenience of explanation, the +z-axis direction, i.e., the upside in FIG. 1 is also referred to as "upper" or "above" and the −z-axis direction, i.e., the downside is also referred to as "lower" or "below". Further, with respect to a robot arm 20, a base 21 side in FIG. 1 is referred to as "proximal end" and the opposite side, i.e., an end effector 7 side is referred to as "distal end". Furthermore, the z-axis directions, i.e., upward and downward directions in FIG. 1 are referred to as "vertical directions" and the x-axis directions and the y-axis directions, i.e., leftward and rightward directions are referred to as "horizontal directions".

A robot system 100 shown in FIGS. 1 and 2 is used for work of e.g. holding, transport, assembly, inspection, etc. of works including electronic components and electronic apparatuses. The robot system 100 includes a control apparatus 1, a robot 2, a force detection unit 4, and an end effector 7. In addition, the robot system 100 includes a display device 41, an input device 42, etc.

The control apparatus 1 is provided inside of a base 21 of the robot 2. Note that the control apparatus 1 may be placed in a position different from that in the robot 2, i.e., outside of the robot 2.

The robot 2 is a horizontal articulated robot, i.e., a scalar robot in the illustrated configuration. As shown in FIG. 1, the robot 2 includes the base 21, a first arm 22, a second arm 23, a third arm 24 as a working head, and a force detection section 5. The first arm 22, the second arm 23, and the third arm 24 form a robot arm 20.

Further, the robot 2 includes a drive unit 25 as a first drive unit that rotates the first arm 22 relative to the base 21, a drive unit 26 as a second drive unit that rotates the second arm 23 relative to the first arm 22, a u-drive unit 27 that rotates a shaft 241 of the third arm 24 relative to the second arm 23, a z-drive unit 28 that moves the shaft 241 in the z-axis directions relative to the second arm 23, and an angular velocity sensor 29.

As shown in FIGS. 1 and 2, the drive unit 25 is provided inside of a housing 220 of the first arm 22 and has a motor 251 that generates a drive force, a reducer 252 that reduces the drive force of the motor 251, and a position sensor 253 that detects the rotation angle of the rotation shaft of the motor 251 or the reducer 252.

The drive unit 26 is provided inside of a housing 230 of the second arm 23 and has a motor 261 that generates a drive force, a reducer 262 that reduces the drive force of the motor 261, and a position sensor 263 that detects the rotation angle of the rotation shaft of the motor 261 or the reducer 262.

The u-drive unit 27 is provided inside of the housing 230 of the second arm 23 and has a motor 271 that generates a drive force, a reducer 272 that reduces the drive force of the motor 271, and a position sensor 273 that detects the rotation angle of the rotation shaft of the motor 271 or the reducer 272.

The z-drive unit 28 is provided inside of the housing 230 of the second arm 23 and has a motor 281 that generates a drive force, a reducer 282 that reduces the drive force of the motor 281, and a position sensor 283 that detects the rotation angle of the rotation shaft of the motor 281 or the reducer 282.

As the motor 251, the motor 261, the motor 271, and the motor 281, e.g. servo motors such as AC servo motors or DC servo motors may be used.

As the reducer 252, the reducer 262, the reducer 272, and the reducer 282, e.g. planet gear reducers, wave gearings, or the like may be used. Further, as the position sensor 253, the position sensor 263, the position sensor 273, and the position sensor 283, e.g. angle sensors may be used.

The drive unit 25, the drive unit 26, the u-drive unit 27, and the z-drive unit 28 are respectively coupled to corresponding motor drivers (not shown) and controlled by a robot control unit 11 of the control apparatus 1 via the motor drivers.

As shown in FIG. 1, the angular velocity sensor 29 is provided inside of the second arm 23. Accordingly, the sensor may detect the angular velocity of the second arm 23. The control apparatus 1 performs control of the robot 2 based on information of the detected angular velocity.

The base 21 is fixed to an installation surface 200 via the force detection unit 4. The installation surface 200 includes e.g. a floor, ceiling, and wall.

The first arm 22 is coupled to the upper end portion of the base 21. The first arm 22 is rotatable about a first axis O1 along the vertical directions relative to the base 21. When the drive unit 25 that rotates the first arm 22 drives, the first arm 22 rotates within a horizontal plane about the first axis O1 relative to the base 21. The position sensor 253 is configured to detect the amount of rotation of the first arm 22 relative to the base 21.

The second arm 23 is coupled to the distal end portion of the first arm 22. The second arm 23 is rotatable about a second axis O2 along the vertical directions relative to the first arm 22. The axial direction of the first axis O1 is the same as the axial direction of the second axis O2. That is, the second axis O2 is parallel to the first axis O1. When the drive unit 26 that rotates the second arm 23 drives, the second arm 23 rotates within a horizontal plane about the second axis O2 relative to the first arm 22. The position sensor 263 is configured to detect the amount of drive, i.e., the amount of rotation of the second arm 23 relative to the first arm 22.

In the embodiment, the first axis O1 is eccentrically located toward the −y-axis side with respect to the center axis of the base 21. Note that the center axis of the base 21 refers to an axis passing through the geometric center of the shape of the contour when the base 21 is seen from the z-axis side and parallel to the z-axis.

The third arm 24 is placed and supported in the distal end portion of the second arm 23. The third arm 24 has the shaft 241. The shaft 241 is rotatable about a third axis O3 along the vertical directions relative to the second arm 23 and movable in the upward and downward directions. The shaft 241 is the arm at the most distal end of the robot arm 20.

When the u-drive unit 27 that rotates the shaft 241 drives, the shaft 241 rotates about the z-axis. Further, the position sensor 273 is configured to detect the amount of rotation of the shaft 241 relative to the second arm 23.

When the z-drive unit 28 that moves the shaft 241 in the z-axis directions drives, the shaft 241 moves in the upward and downward directions, i.e., in the z-axis directions. Further, the position sensor 283 is configured to detect the amount of movement of the shaft 241 in the z-axis directions relative to the second arm 23.

As described above, the robot arm 20 has the first arm 22, the second arm 23 coupled to the first arm 22 at the opposite side to the base 21 and pivoting about the second axis O2 parallel to the first axis O1, and the third arm 24 supported by the second arm 23 and moving along the axial direction of the third axis O3 in a different position from the second axis O2 and in parallel to the second axis O2. The movable range in the xy plane may be sufficiently secured by the first arm 22 and the second arm 23, and the robot arm may also be actuated in the z-axis directions by the third arm 24.

Further, various end effectors are detachably coupled to the distal end portion of the shaft 241. The end effector is not particularly limited to, but includes e.g. one that grips an object to be transported, one that processes an object to be processed, and one used for inspection. In the embodiment, the end effector 7 is detachably coupled. In the illustrated configuration, the end effector 7 fastens screws. Note that, not limited to that, but the end effector may be e.g. a hand with claws or hand having a suction portion.

The end effector 7 is not a component element of the robot 2 in the embodiment, however, a part or entire of the end effector 7 may be a component element of the robot 2. Or, the end effector 7 is not a component element of the robot arm 20 in the embodiment, however, a part or entire of the end effector 7 may be a component element of the robot arm 20.

Next, the control apparatus 1 will be explained.

As shown in FIG. 1, the control apparatus 1 has a function of controlling driving of the robot 2 and is communicably coupled to the robot 2. Note that the communication between the robot 2 and the control apparatus 1 may be respectively via wired connection or wireless connection. In the illustrated configuration, the control apparatus 1 is placed in a position different from that of the robot 2, i.e., a distant position, however, may be provided inside of the robot 2.

As shown in FIG. 2, the control apparatus 1 includes the robot control unit 11, an end effector control unit 12, a display control unit 13, a storage unit 14 having a memory etc., and a receiving unit 15 having an external interface (I/F). The respective component elements of the control apparatus 1 are coupled communicably with one another via various buses.

The robot control unit 11 controls driving of the robot arm 20 etc. The end effector control unit 12 controls driving of the end effector 7. The robot control unit 11 and the end effector control unit 12 are computers in which programs such as OS are installed and have CPUs as processors, RAMs, and ROMs in which the programs are stored. These functions may be realized by e.g. execution of various programs by the CPUs.

The display control unit 13 has a function of displaying various screens such as windows and characters on the display device 41. That is, the display control unit 13 controls driving of the display device 41. The function of the display control unit 13 may be realized by e.g. a GPU or the like.

In the storage unit 14, various programs that can be executed by the robot control unit 11, the end effector control unit 12, and the display control unit 13, reference data, threshold values, calibration curves used during control operation, etc. are stored. Further, in the storage unit 14, various kinds of data received by the receiving unit 15 can be stored. The storage unit 14 includes e.g. a volatile memory such as a RAM (Random Access Memory), non-volatile memory such as a ROM (Read Only Memory), etc. Note that the storage unit 14 is not limited to the undetachable type but may have a detachable external memory device. Or, the storage unit 14 may be placed in another location via a network such as a LAN (Local Area Network).

The receiving unit 15 includes the external interface (I/F) and is used for respective couplings of the robot 2, the display device 41, the input device 42, etc. The receiving unit 15 functions as an acquisition unit that receives, in other words, acquires a teaching signal from the input device 42.

Note that another configuration may be added to the control apparatus 1 in addition to the above described configurations. Various programs, data, etc. stored in the storage unit 14 may be stored in the storage unit 14 in advance, stored in e.g. a recording medium such as a CD-ROM and provided from the recording medium, or provided via a network or the like.

The display device 41 has a monitor (not shown) including e.g. a liquid crystal display and an EL display, and has a function of displaying various images including various screens such as windows and characters.

The input device 42 includes e.g. a mouse, keyboard, mobile terminal, and teaching pendant. Therefore, a user operates the input device 42, and thereby, may give instructions of various kinds of processing etc. to the control apparatus 1.

Next, the force detection unit 4 will be explained.

The force detection unit 4 has the force detection section 5 coupled to the base 21, a coupling member 6, a plurality of first fixing members 9A, and a plurality of second fixing members 9B.

As shown in FIGS. 1 and 3 to 5, the force detection section 5 detects a force applied to the robot 2, i.e., a force applied to the robot arm 20 and the base 21. The force detection section 5 is provided at the downside, i.e., the −z-axis side of the base 21 and supports the base 21 from the downside.

Further, as shown in FIG. 3, the force detection section 5 is a member having a first plate 51, a second plate 52, a tubular portion 53 placed between the first plate 51 and the second plate 52, a plurality of, in the embodiment, four elements 54, and a columnar outer shape. Further, the four elements 54 are sandwiched between the first plate 51 and the second plate 52. The number of the elements 54 is not limited to that, but may be three or less, five, or more.

The first plate 51 has a circular plate shape and the second plate 52 has a shape formed by cutout of corner portions of a square shape. These first plate 51 and second plate 52 are placed apart sequentially from the +z-axis side. Note that the shapes of the first plate 51 and the second plate 52 in the plan view are not limited to the above described shapes.

The second plate 52 is a part fixed to the coupling member 6, which will be described later. The second plate 52 has a plurality of concave portions 521 opening toward the coupling member 6 side in the surface at the coupling member 6 side, i.e., the lower surface. The concave portions 521 are portions into which the first fixing members 9A, which will be described later, are inserted and fixed. Further, the concave portions 521 are formed in positions corresponding to convex parts 62, which will be described later.

As described above, the corner portions of the second plate 52 are cut out, and thereby, the corner portions of the coupling member 6 to be described later are exposed. Therefore, the second fixing members 9B are placed in the portions and fixing work to the installation surface 200 may be easily performed.

In the embodiment, the tubular portion 53 has a cylinder shape and a function of protecting the elements 54.

The respective elements 54 are placed to form a circular shape at equal intervals. Thereby, the forces applied to the respective elements 54 are as uniform as possible and the forces may be accurately detected.

As each element 54, e.g. an element formed using a piezoelectric material such as quartz crystal and outputting electric charge when subjected to an external force may be used. The control apparatus 1 may perform conversion into an external force applied to the end effector 7 according to the amounts of electric charge. Further, such a piezoelectric material can adjust the direction in which the electric charge may be generated when the material is subjected to the external force according to the direction in which the material is placed.

In the embodiment, as shown in FIG. 4, each element 54 may detect a force Fz as a component in the vertical direction and a force Fu about the z-axis, i.e., in the u-axis direction. That is, the force detection section 5 detects the force Fz in the axial direction of the third axis O3. Thereby, the work of moving the shaft 241 along the z-axis directions may be performed more accurately.

In the illustrated example, the four elements 54 are provided at equal intervals around a center axis O5 of the force detection section 5. Note that the number of the elements is not limited to that in the present disclosure, but may be e.g. three or less, five, or more. The center axis O5 is an axis parallel to the z-axis directions passing through the detection center, i.e., the origin of the force detection section 5.

As shown in FIG. 5, the coupling member 6 is a member provided between the installation surface 200 on which the robot 2 is placed and the force detection section 5 and coupling and fixing these. The coupling member 6 has a plate-like main body part 61, a plurality of the convex parts 62, and a reinforcing part 63. A center axis O6 of the coupling member 6 is aligned with the center axis O5 of the force detection section 5.

The main body part 61 has a rectangular shape in the plan view and has a recessed portion 611 and a recessed portion 612. The recessed portion 611 is a concave portion opening toward the +z-axis side, i.e., the force detection section 5 side and having a bottom, into which the second plate 52 of the force detection section 5 is entered. The recessed portion 611 has a shape corresponding to the plan view shape of the second plate 52 as seen from the z-axis side.

The recessed portion 612 having a circular shape in the plan view is formed in the bottom part of the recessed portion 611. The center of the recessed portion 612 overlaps with the center axis O6. The recessed portion 612 is formed, and thereby, it may be harder for the coupling member 6 and the second plate 52 to interfere with each other.

Further, near the four corner portions of the main body part 61, insertion holes 613 as second insertion holes through which the second fixing members 9B are inserted are formed. The insertion holes 613 include through holes penetrating in the thickness direction of the main body part 61. With the second fixing members 9B inserted through the insertion holes 613, the distal end portions of the second fixing members 9B, i.e., the end portions at the −z-axis side are fixed to the installation surface 200, and thereby, the coupling member 6 may be fixed to the installation surface 200.

As shown in FIG. 8, a second figure S2 formed by line segments L2 connecting the centers of the adjacent insertion holes 613 has a square shape as seen from the z-axis direction. Two vertices of the second figure S2 are located at the −y-axis side, i.e., at the side toward which the first axis O1 is eccentrically located in the base 21 and the other two vertices are located at the +y-axis side.

Note that, as shown in FIG. 7, in the installation surface 200, installation holes 201 are formed in positions corresponding to the respective insertion holes 613. The second fixing members 9B are inserted through both the insertion holes 613 and the installation holes 201, and thereby, may fix the coupling member 6 to the installation surface 200. Or, the second fixing members 9B and the installation holes 201 may be fixed by e.g. screwing, fitting, joining via adhesives, or the like.

In the bottom part of the recessed portion 611, the convex parts 62 projecting toward the −z-axis side, i.e., the force detection section 5 side are provided. The convex parts 62 have a function of contacting the lower surface of the second plate 52 of the force detection section 5 inserted into the recessed portion 611 and separating the second plate 52 from the bottom part of the recessed portion 611. In the embodiment, the convex parts 62 and the second plate 52 contact each other, however, a sheet-like member may intervene between the convex parts 62 and the second plate 52. In this case, either of the convex parts 62 or the second plate 52 includes the sheet-like member.

In the embodiment, the three convex parts 62 are provided in the bottom part of the recessed portion 611 close to the edge part of the recessed portion 612. The respective convex parts 62 are placed at equal intervals around the center axis O6. Each convex part 62 has a section in the x-y plane in a circular outer shape.

As shown in FIG. 8, a first figure S1 formed by line segments L1 connecting the centers of the adjacent convex parts 62 has a regular triangular shape. One vertex of the first figure S1 is located at the −y-axis side, i.e., at the side toward which the first axis O1 is eccentrically located in the base 21 and the other two vertices are located at the +y-axis side.

As shown in FIG. 5, the reinforcing part 63 is provided to project toward the −y-axis side and project toward the +z-axis side of the main body part 61. Further, the reinforcing part 63 has an elongated shape extending in the x-axis directions. The reinforcing part 63 is thicker than the other portions of the main body part 61 and has higher rigidity.

The reinforcing part 63 contacts the edge part at the −y-axis side of the second plate 52 of the force detection section 5 and supports the second plate 52. As described above, the robot arm 20 moves at the −y-axis side of the first axis O1 and load tends to be applied to the part at the −y-axis side of the coupling member 6. The part to which the load tends to be applied is reinforced by the reinforcing part 63, and thereby, deformation and breakage over time of the coupling member 6 may be effectively prevented or suppressed.

As shown in FIGS. 5 and 6, the coupling member 6 has insertion holes 64 through which the first fixing members 9A are inserted. The insertion holes 64 include through holes penetrating in the thickness direction of the coupling member 6 and are formed in positions in which the convex parts 62 are provided. That is, the insertion holes 64 include through holes penetrating from the surfaces at the +z-axis side of the convex parts 62 to the lower surface of the coupling member 6.

In the embodiment, the first fixing members 9A are bolts inserted from the installation surface 200 side through the insertion holes 64. Thereby, the first fixing members 9A may be inserted through the insertion holes 64 and effectively fix the force detection section 5 and the coupling member 6.

The insertion holes 64 have expanded diameter portions 641 located at the −z-axis side, i.e., the opposite side to the force detection section 5 and having expanded inner diameters. The expanded diameter portions 641 are portions that the heads of the first fixing members 9A enter.

As described above, the insertion holes 64 are provided in the convex parts 62, the first fixing members 9A are inserted through the insertion holes 64, and the force detection section 5 and the coupling member 6 are fixed. That is, the first fixing members 9A are placed in the positions where the convex parts 62 are provided and fix the force detection section 5 and the coupling member 6. For example, even when irregularities are formed on the installation surface 200 and the coupling member 6 fixed to the installation surface 200 is distorted, gaps are formed between the force detection section 5 and the coupling member 6. Thereby, the force detection section 5 may be hardly affected by the distortion of the coupling member 6. Therefore, the detection accuracy of the force detection section 5 may be increased. Further, the force detection section 5 and the coupling member 6 are fixed in the positions where the convex parts 62 are formed, and thus, the contact parts between the force detection section 5 and the coupling member 6 may be reduced as much as possible and the force detection section 5 may be hardly affected by the distortion of the coupling member 6 more effectively.

As shown in the drawings, the three convex parts 62 are preferably provided. The three convex parts are provided, and thereby, the contact surfaces between the respective convex parts 62 and the force detection section 5 may be planar surfaces and the influence on the force detection section 5 by the distortion of the coupling member 6 may be reduced as much as possible.

Note that the convex parts 62 may be in contact with or separated from the force detection section 5. That is, the first fixing members 9A may fix the convex parts 62 and the second plate 52 of the force detection section 5 separated from each other.

The insertion holes 64 through which the first fixing members are inserted are provided in the convex parts 62. Thereby, the force detection section 5 and the coupling member 6 are fixed in the positions where the convex parts 62 are formed, and the above described effects may be exerted more effectively.

The concave portions 521 into which the first fixing members 9A are inserted are provided in the force detection section 5, and the first fixing members 9A are inserted through the insertion holes 64 and inserted into the concave portions 521 and fix the force detection section 5 and the coupling member 6. Thereby, the force detection section 5 and the coupling member 6 may be effectively fixed by the first fixing members 9A.

Or, the first fixing members 9A and the concave portions 521 may be fixed by e.g. screwing, fitting, joining via adhesives, or the like.

As described above, the robot 2 includes the second fixing members 9B that fix the coupling member 6 to the installation surface 200. As seen from the z-axis direction as a first direction in which the force detection section 5 and the coupling member 6 overlap, the placement positions of the first fixing members 9A and the placement positions of the second fixing members 9B are different. In the parts where the first fixing members 9A are placed, stress due to fixation tends to be concentrated between the force detection section 5 and the coupling member 6 and, in the parts where the second fixing members 9B are placed, stress due to fixation tends to be concentrated between the coupling member 6 and the installation surface 200. The parts do not overlap as seen from the z-axis direction, and thereby, as the whole force detection unit 4, the parts on which stress tends to be concentrated are dispersed in the whole. As a result, the detection accuracy of the force detection section 5 may be further increased.

As shown in FIG. 8, the plurality of, in the embodiment, the four second fixing members 9B are provided, and a center S10 as the center of gravity of the first figure S1 formed by the line segments L1 connecting the centers of the adjacent convex parts 62 and a center S20 as the center of gravity of the second figure S2 formed by the line segments L2 connecting the centers of the adjacent insertion holes 613 overlap as seen from the z-axis direction. Thereby, as the whole force detection unit 4, the parts on which stress tends to be concentrated are dispersed more uniformly in the whole. Thus, the detection accuracy of the force detection section 5 may be further increased.

As described above, the force detection section 5 has the first plate 51 at the base 21 side, the second plate 52 at the coupling member 6 side, and the plurality of, in the embodiment, the four elements 54 as force detection elements provided between the first plate 51 and the second plate 52.

As seen from the z-axis direction as the first direction, the center axis O5 passing through the center (center of gravity) of a third figure S3 formed by line segments L3 connecting the adjacent elements 54 overlaps with the center S10 as the center of gravity of the first figure S1. Thereby, the above described influence by the stress due to fixation may be dispersed as uniform as possible in the respective elements 54. Therefore, the detection accuracy of the force detection section 5 may be further increased.

As described above, the robot 2 includes the base 21 installed on the installation surface 200, the robot arm 20 coupled to the base 21, the force detection section 5 coupled to the base 21 and detecting the force applied to the robot arm 20, the coupling member 6 having the plurality of convex parts 62 provided between the installation surface 200 and the force detection section 5, projecting toward the force detection section 5 side, and contacting the force detection section 5, and the first fixing members 9A provided in the positions where the convex parts 62 are provided and fixing the force detection section 5 and the coupling member 6. Thereby, the force detection section 5 may be hardly affected by the distortion of the coupling member 6. Therefore, the detection accuracy of the force detection section 5 may be increased. Further, the force detection section 5 and the coupling member 6 are fixed in the positions where the convex parts 62 are provided, and thus, the contact parts between the force detection section 5 and the coupling member 6 may be reduced as much as possible and the force detection section 5 may be hardly affected by the distortion of the coupling member 6 more effectively.

Second Embodiment

Figure 9:
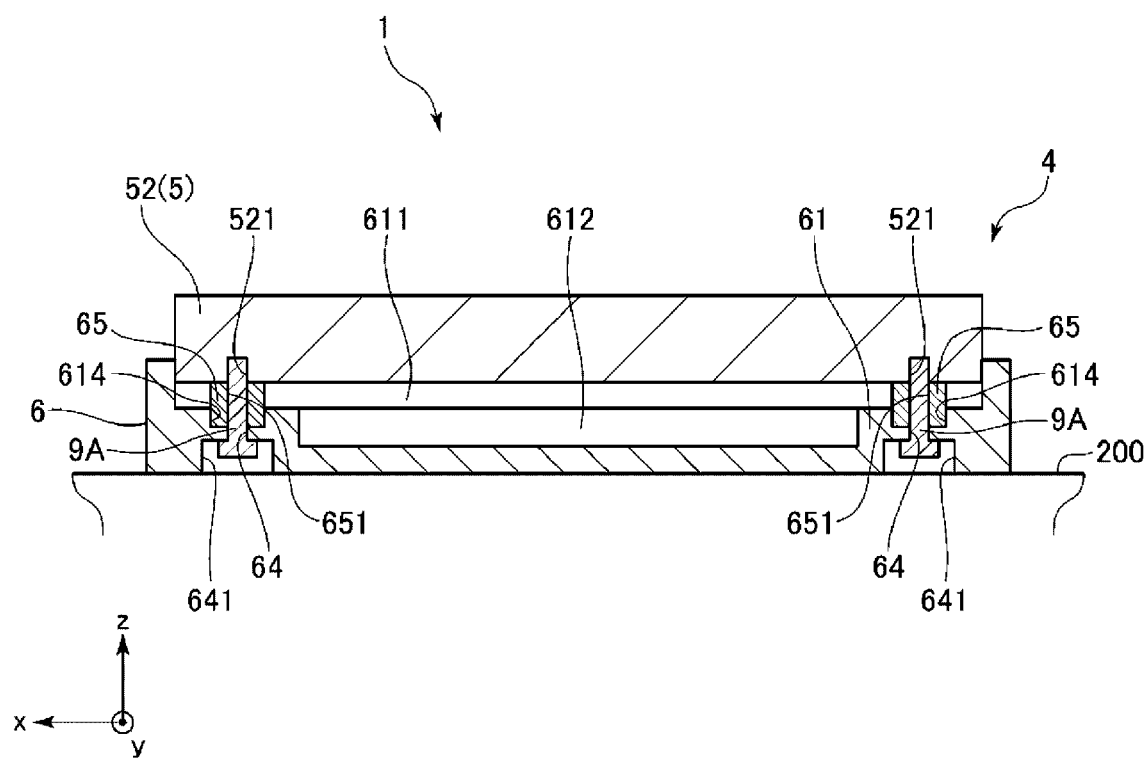
FIG. 9 is a longitudinal sectional view of a force detection unit provided in a second embodiment of the robot according to the present disclosure.

FIG. 9 is the longitudinal sectional view of the force detection unit provided in the second embodiment of the robot according to the present disclosure.

As below, the second embodiment will be explained, and the explanation will be made with a focus on differences from the first embodiment and the explanation of the same items will be omitted.

As shown in FIG. 9, in the embodiment, the force detection unit 4 has the force detection section 5, the coupling member 6, and a plurality of spacers 65 formed separately from the coupling member 6.

In the embodiment, the coupling member 6 has placement holes 614 provided in the bottom part of the recessed portion 611 close to the edge part of the recessed portion 612. The spacers 65 are inserted and placed in the placement holes 614. The plan view shapes, i.e., the opening shapes of the placement holes 614 are set according to the shapes of the spacers 65. Note that the number and positions of the formed placement holes 614 are the same as those of the convex parts 62 described in the first embodiment.

The spacers 65 have heights, i.e., lengths in the z-axis directions longer than the depths of the placement holes 614. Accordingly, when the spacers 65 are placed in the placement holes 614, the spacers 65 project from the placement holes 614 toward the +z-axis side. Further, the three spacers 65 are provided in the embodiment. The spacers 65 are provided between the force detection section 5 and the coupling member 6 and have a function of separating the force detection section 5 and the coupling member 6.

The spacers 65 have tubular shapes. That is, the spacers 65 have through holes 651 penetrating in the z-axis directions. The through holes 651 are parts through which the first fixing members 9A are inserted. The first fixing members 9A are inserted through all of the insertion holes 64, the through holes 651, and the concave portions 521 and fix those, and thereby, may fix the force detection section 5 and the coupling member 6 separated from each other.

As described above, the robot 2 of the embodiment includes the base 21 installed on the installation surface 200, the robot arm 20 coupled to the base 21, the force detection section 5 coupled to the base 21 and detecting the force applied to the robot arm 20, the coupling member 6 provided between the installation surface 200 and the force detection section 5, the plurality of spacers 65 provided between the force detection section 5 and the coupling member 6 and separating the force detection section 5 and the coupling member 6, and the first fixing members 9A provided in the positions where the spacers 65 are provided and fixing the force detection section 5 and the coupling member 6. Thereby, the force detection section 5 may be hardly affected by the distortion of the coupling member 6. Therefore, the detection accuracy of the force detection section 5 may be increased. Further, the force detection section 5 and the coupling member 6 are fixed in the positions where the spacers 65 are provided, and thus, the contact parts between the force detection section 5 and the spacers 65 may be reduced as much as possible and the force detection section 5 may be hardly affected by the distortion of the coupling member 6 more effectively. Furthermore, for example, the spacers 65 having different heights are selectively placed, and thereby, the separation distance between the force detection section 5 and the coupling member 6 may be adjusted.

As above, the robot according to the present disclosure is explained based on the illustrated embodiments, however, the present disclosure is not limited to those. The configurations of the respective parts of the robot may be replaced by arbitrary structures having the same functions. Further, another arbitrary structure may be added thereto.

In the above described embodiments, the first fixing members and the second fixing members are the bolts, however, not limited to those in the present disclosure. The members may be bottle nuts. Or, the first fixing members and the second fixing members may be e.g. joining members such as adhesives.

In the above described embodiments, the number of rotation axes of the robot arm is three, however, not limited to that in the present disclosure. The number of rotation axes of the robot arm may be e.g. four or more. That is, in the above described embodiments, the number of arms is three, however, not limited to that in the present disclosure. The number of arms may be e.g. four or more.

What is claimed is:

1. A robot comprising:
a base installed on an installation surface;
a robot arm coupled to the base;
a force detection section coupled to the base and being configured to detect a force applied to the robot arm;
a coupling member having a plurality of convex parts provided between the installation surface and the force detection section, being configured to project toward a side of the force detection section, and to contact the force detection section; and
first fixing members provided in positions where the convex parts are provided and being configured to fix the force detection section and the coupling member.

2. The robot according to claim 1, wherein
insertion holes through which the first fixing members are inserted are provided in the convex parts.

3. The robot according to claim 2, wherein
concave portions into which the first fixing members are entered are provided in the force detection section, and
the first fixing members are inserted through the insertion holes and inserted into the concave portions, and thereby, fix the force detection section and the coupling member.

4. The robot according to claim 2, wherein
the first fixing members are bolts inserted from the installation surface side through the insertion holes.

5. A robot comprising:
a base installed on an installation surface;
a robot arm coupled to the base;
a force detection section coupled to the base and being configured to detect a force applied to the robot arm;
a coupling member provided between the installation surface and the force detection section;
a plurality of spacers provided between the force detection section and the coupling member and being configured to separate the force detection section and the coupling member; and
first fixing members provided in positions where the spacers are provided and being configured to fix the force detection section and the coupling member.

6. The robot according to claim 5, further comprising a second fixing member that fixes the coupling member to the installation surface, wherein
placement positions of the first fixing members and a placement position of the second fixing member are different as seen from a first direction as a direction in which the coupling member and the force detection section overlap.

7. The robot according to claim 6, wherein
a plurality of the second fixing members are provided, and
a center of gravity of a first figure formed by line segments configured to connect the adjacent first fixing members and a center of gravity of a second figure formed by line segments configured to connect the adjacent second fixing members overlap as seen from the first direction.

8. The robot according to claim 7, wherein
the force detection section has a first plate at the base side, a second plate at the coupling member side, and a plurality of force detection elements provided between the first plate and the second plate, and
a center of gravity of a third figure formed by line segments configured to connect the adjacent force detection elements and the center of gravity of the first figure overlap as seen from the first direction.

* * * * *